(12) United States Patent
Pozin et al.

(10) Patent No.: US 11,502,532 B2
(45) Date of Patent: Nov. 15, 2022

(54) BATTERY

(71) Applicant: DURACELL U.S. OPERATIONS, INC., Wilmington, DE (US)

(72) Inventors: Michael Pozin, Brookfield, CT (US); Fred J. Berkowitz, New Milford, CT (US); Steven J. Specht, Brookfield, CT (US); Yelena Kouznetsova, Brookfield, CT (US); Bhupendra K. Patel, Danbury, CT (US); Yang Zhao, Nanping (CN); Haitao Chang, Nanping (CN)

(73) Assignee: DURACELL U.S. OPERATIONS, INC., Wilmington, DE (US)

(*) Notice: Subject to any disclaimer, the term of this patent is extended or adjusted under 35 U.S.C. 154(b) by 95 days.

(21) Appl. No.: 17/248,829

(22) Filed: Feb. 9, 2021

(65) Prior Publication Data

US 2021/0167618 A1     Jun. 3, 2021

Related U.S. Application Data

(60) Continuation of application No. 16/710,878, filed on Dec. 11, 2019, now Pat. No. 10,916,956, which is a continuation of application No. 13/668,917, filed on Nov. 5, 2012, now Pat. No. 10,536,016, which is a
(Continued)

(51) Int. Cl.
| | |
|---|---|
| *H02J 7/00* | (2006.01) |
| *H01M 4/38* | (2006.01) |
| *H01M 4/136* | (2010.01) |
| *H01M 6/16* | (2006.01) |
| *H01M 4/58* | (2010.01) |
| *H01M 6/18* | (2006.01) |
| *H01M 4/02* | (2006.01) |
| *H01M 50/60* | (2021.01) |

(52) U.S. Cl.
CPC .......... *H02J 7/0063* (2013.01); *H01M 4/136* (2013.01); *H01M 4/382* (2013.01); *H01M 4/5815* (2013.01); *H01M 6/16* (2013.01); *H01M 6/18* (2013.01); *H01M 50/60* (2021.01); *H01M 2004/021* (2013.01); *Y02E 60/10* (2013.01)

(58) Field of Classification Search
CPC .......... H01M 2004/021; H01M 4/136; H01M 4/382; H01M 4/5815; H01M 50/60; H01M 6/16; H01M 6/18; H02J 7/0063; Y02E 60/10
See application file for complete search history.

(56) References Cited

U.S. PATENT DOCUMENTS

| | | |
|---|---|---|
| 345,124 A | 7/1886 | De Virloy et al. |
| 4,279,972 A | 7/1981 | Moses |
| 4,401,735 A | 8/1983 | Moses et al. |

(Continued)

FOREIGN PATENT DOCUMENTS

JP    2006-351249 A    12/2006

OTHER PUBLICATIONS

Office Action for U.S. Appl. No. 13/668,917 dated Dec. 3, 2015, dated Jul. 31, 2018.
(Continued)

*Primary Examiner* — Lingwen R Zeng
(74) *Attorney, Agent, or Firm* — Marshall, Gerstein & Borun LLP

(57) ABSTRACT

A battery includes an anode having an alkali metal as the active material, a cathode having, for example, iron disulfide as the active material, and an increased electrolyte volume.

16 Claims, 2 Drawing Sheets

Related U.S. Application Data division of application No. 12/244,123, filed on Oct. 2, 2008, now Pat. No. 8,304,116.

(56) References Cited

U.S. PATENT DOCUMENTS

| | | |
|---|---|---|
| 4,481,267 A | 11/1984 | Bowden et al. |
| 4,526,846 A | 7/1985 | Kearney et al. |
| 4,891,283 A | 1/1990 | Bowden et al. |
| 5,176,968 A | 1/1993 | Blasi et al. |
| 5,595,841 A | 1/1997 | Suzuki |
| 6,680,140 B1 | 1/2004 | Berlureau et al. |
| 6,733,925 B2 | 5/2004 | Hironaka et al. |
| 8,304,116 B2 | 11/2012 | Pozin et al. |
| 2005/0112467 A1 | 5/2005 | Berkowitz et al. |
| 2005/0112468 A1 | 5/2005 | Berkowitz et al. |
| 2005/0202320 A1 | 9/2005 | Totir et al. |
| 2006/0046154 A1 | 3/2006 | Webber et al. |
| 2008/0182157 A1 | 7/2008 | Visco et al. |
| 2009/0186263 A1 | 7/2009 | Pozin et al. |
| 2009/0291366 A1 | 11/2009 | Stevanovic et al. |
| 2010/0062332 A1 | 3/2010 | Kumeuchi |
| 2010/0086833 A1 | 4/2010 | Pozin et al. |
| 2011/0003213 A1 | 1/2011 | Burchardt et al. |

OTHER PUBLICATIONS

Office Action for U.S. Appl. No. 13/668,917 dated Dec. 3, 2015, dated Feb. 27, 2019.

Office Action for U.S. Appl. No. 13/668,917 dated Dec. 3, 2015, dated Dec. 22, 2017.

Office Action for U.S. Appl. No. 13/668,917 dated Dec. 3, 2015, dated Jun. 2, 2017.

Office Action for U.S. Appl. No. 13/668,917 dated Dec. 3, 2015, dated Jul. 26, 2016.

Office Action for U.S. Appl. No. 13/668,917 dated Dec. 3, 2015, dated Dec. 3, 2015.

Handbook of Batteries (McGraw-Hill, 2d ed. 1995), pp. 1.9-1.11; 7.3-7.7; 11.79-11.80; 12.1-12.16; 23.3-23.12.

Falk & Salkind, "Alkaline Storage Batteries", John Wiley & Sons, Inc. 1969, pp. 1-41.

BATTERY

CROSS-REFERENCE TO RELATED APPLICATION

This application is a continuation of U.S. Ser. No. 16/710,878, filed on Dec. 11, 2019, which is a continuation of U.S. Ser. No. 13/668,917, filed on Nov. 5, 2012, which is a divisional application of and claims priority to U.S. Ser. No. 12/244,123, filed on Oct. 2, 2008, eahc of which are hereby incorporated by reference.

TECHNICAL FIELD

The invention relates to batteries, as well as to related components and methods.

BACKGROUND

Batteries or electrochemical cells are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

One type of battery includes an alkali metal as the anode active material and iron disulfide as the cathode active material. The battery can be a primary battery. Primary batteries are meant to be discharged (e.g., to exhaustion) only once, and then discarded. In other words, primary batteries are not intended to be recharged. Primary batteries are described, for example, in David Linden, *Handbook of Batteries* (McGraw-Hill, 2d ed. 1995). In contrast, secondary batteries can be recharged for many times (e.g., more than fifty times, more than a hundred times, or more). In some cases, secondary batteries can include relatively robust separators, such as those having many layers and/or that are relatively thick. Secondary batteries can also be designed to accommodate for changes, such as swelling, that can occur in the batteries. Secondary batteries are described, for example, in Falk & Salkind, "Alkaline Storage Batteries", John Wiley & Sons, Inc. 1969, and DeVirloy et al., U.S. Pat. No. 345,124.

SUMMARY

The disclosures relates to batteries, as well as to related components and methods.

Sometimes, as a primary lithium battery including, for example, $FeS_2$ as the cathode active material, discharges, the resulting products of the battery can occupy less volume compared to the initial reagents, resulting in an increased void volume (e.g., increased porosity). If the amount of electrolyte in the battery is not adjusted for the additional void volume that is created over the course of discharge, the battery would perform at less than optimal levels because the amount of electrolyte in the battery would not be sufficient to fill the cathode pores, wet all of the active cathode surface, and promote transportation of Li ions in the cathode matrix. Thus, the battery performance may degrade.

The invention generally relates to the recognition that for primary lithium batteries, such as $Li/FeS_2$ cells, a volume of electrolyte greater than a theoretical calculated minimum required volume for filling pores in a cathode and separator, can improve cell performance. The volume of electrolyte required to fill cathode and separator pores can compensate for the change in cathode volume resulting from cell discharge. The volume of electrolyte can allow for full contact between the electrolyte and the active cathode surface, and can transport Li ions in the cathode matrix throughout the discharge process.

The additional void volume formed during discharge of the battery can be calculated from the electrochemical reaction that occurs when the battery operates. In turn, the increase in void volume can be used to calculate the theoretical minimum electrolyte volume or a ratio of the electrolyte volume (v) to cathode active material mass (m) for a given electrochemical cell. The theoretical minimum electrolyte volume and the v to m ratio will be discussed further in the detailed description.

In one aspect, the invention features a method of making a battery. The battery includes a housing including an anode including an alkali metal, a cathode including a transition metal polysulfide, and a volume (v) of an electrolyte. The method includes determining a total pore volume in the battery prior to discharge, a void volume that will be generated when the battery is discharged to exhaustion once, and adjusting the volume (v) of electrolyte to greater than a sum of the total pore volume and the void volume.

In another aspect, the invention features a battery including a housing. Within the housing are: an anode including an alkali metal; a cathode including a mass (m) of a cathode active material including one or more transition metal polysulfides having the formula $M1_aM2_bS_n$; and a volume (v) of an electrolyte. M1 and M2 are transition metals, a+b is at least 1, and n is at least 2(a+b). The battery includes a total pore volume prior to discharge, a void volume that will be generated when the battery is discharged to exhaustion, and the volume (v) of the electrolyte is greater than the sum of the total pore volume and the void volume. In some embodiments, the invention features a primary battery, where using the battery includes discharging but not recharging the battery.

Embodiments can include one or more of the following features.

In some embodiments, the battery has an electrolyte volume (v) to transition metal polysulfide mass (m) ratio of at least 0.33 ml/g and/or at most 0.5 ml/g. The mass (m) can be at least four grams and/or at most six grams. For example, the mass (m) can be at least 4.5 grams (e.g., at least 4.97 grams). The v/m ratio can maintain ion transport in a battery.

In some embodiments, the battery (e.g., a AA battery) has a volume of electrolyte of at least 0.4 ml (e.g., at least 0.5 ml, at least 0.6 ml, or at least 0.7 ml) greater than the sum of the total pore volume and the void volume. In some embodiments, the volume of electrolyte is at least 1.4 ml and/or at most 2.2 ml. The amount of electrolyte can maintain ion transport in a battery. The electrolyte can include two or more ethers, which can form at least 95 percent by volume (e.g., at least 97 percent by volume, at least 99 percent by volume) of the electrolyte.

In some embodiments, the housing further includes a separator, which can have a thickness of between 12 microns and 25 microns, a porosity of between 37% and 70%, an area specific resistance of as low as 1 Ohm*cm$^2$, and/or a tortuosity of as low as 1.3. In some embodiments, the housing is placed under vacuum, and the volume of electrolyte is placed into the housing when the housing is under vacuum. In some embodiments, when the housing is placed under vacuum, a volume of gas is removed from the contents of the housing (e.g., the pores of the electrodes and the separator).

The cathode can have a porosity of at most 35% (e.g., at most 30%, or at most 25%). The transition metal polysulfide can include one or more materials such as $FeS_2$, $CoS_2$, $NiS_2$, $MoS_2$, $Co_2S_9$, $Co_2S_7$, $Ni_2S_7$, $Fe_2S_7$, $Mo_2S_3$, and/or $NiCoS_7$. In some embodiments, the cathode can further include a material such as CuS, $Cu_2S$, FeS, CuO, $Bi_2O_3$ and/or $CF_x$.

In some embodiments, the alkali metal is lithium. The lithium can be alloyed with aluminum, other alkali or alkali earth metals, or not alloyed with another metal.

In some embodiment, the battery can have an increased void volume during discharge. The electrolyte can compensate for at least 50% (e.g., at least 75%, at least 95%) of the total increase in void volume. In some embodiments, the electrolyte compensates for 100% of the total increase in void volume. In some embodiments, the electrolyte can include a lithium salt.

In some embodiments, the battery is a AA battery. The battery can be a primary battery.

Embodiments can include one or more of the following advantages.

In some embodiments, a battery having an electrolyte to cathode active material (v/m) ratio of at least 0.33 ml/g and/or at most 0.5 ml/g can have a better performance than a battery having an electrolyte to cathode active material ratio of less than 0.33 ml/g. In some embodiments, a battery having an electrolyte volume that is greater than the sum of the total pore volume and the void volume can have a better performance than a battery having an electrolyte volume that is equal to or less than the sum of the total pore volume and the void volume.

Other features and advantages will be apparent from the detailed description, the drawings, and from the claims.

DETAILED DESCRIPTION

Figure 1:
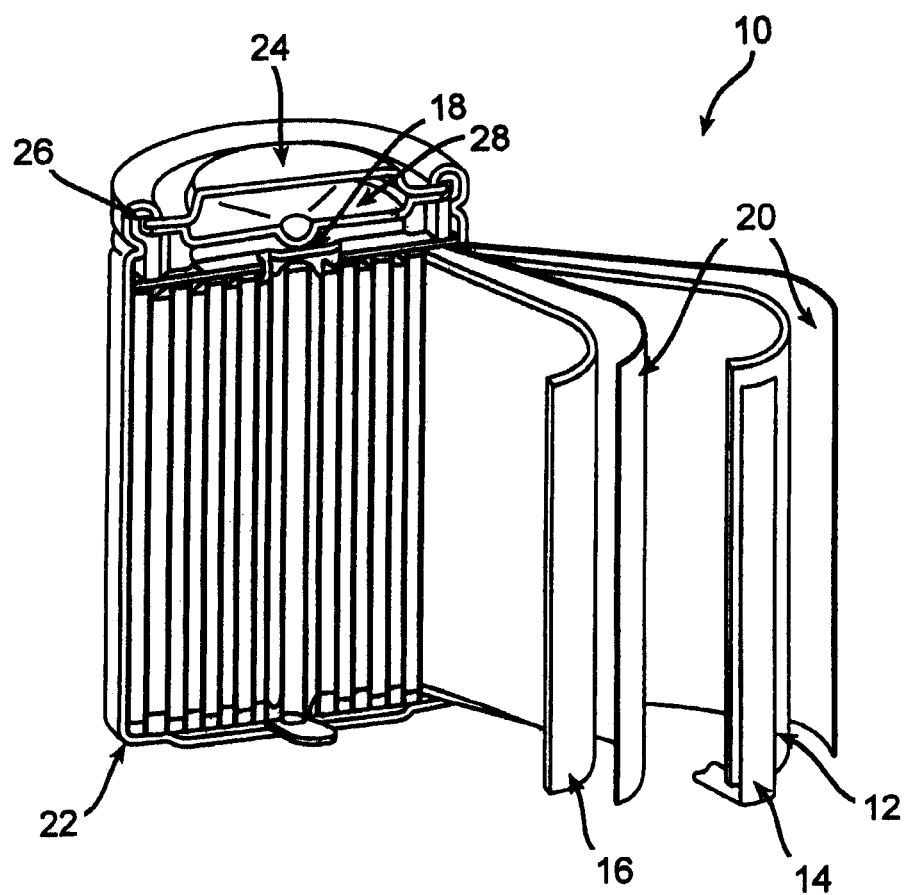
FIG. 1 is a sectional view of an embodiment of a non-aqueous electrochemical cell.

Referring to FIG. 1, a primary electrochemical cell 10 includes an anode 12 in electrical contact with a negative lead 14, a cathode 16 in electrical contact with a positive lead 18, a separator 20, and an electrolyte. Anode 12, cathode 16, separator 20, and the electrolyte are contained within a case 22 (e.g., a housing). Electrochemical cell 10 further includes a cap 24 and an annular insulating gasket 26, as well as a safety valve 28.

Cathode 16 includes a cathode current collector and a cathode material that is coated on at least one side of the cathode current collector. The cathode material includes cathode active material(s) and can also include one or more conductive materials and/or one or more binders.

The cathode material includes, for example, at least about 85% by weight and/or up to about 95% by weight of cathode active material. The cathode active material can include one or more transition metal polysulfides having the formula $M1_a\,M2_b\,S_n$, wherein M1 and M2 are transition metals, a+b is at least 1, and n is at least 2(a+b). In some embodiments, n is 2. In some embodiments, M1 and M2 are the same transition metal. In other embodiments, n is greater than 2.5 (e.g., greater than 3.0). Examples of transition metals include cobalt, copper, nickel, and iron. Examples of transition metal polysulfides include $FeS_2$ (e.g., Pyrox Red 325 powder from Chemetall GmbH, which can include additives to offset or retard any buildup in acidity of the powder, such as up to 1.5% by weight of calcium in form of calcium carbonate), $CoS_2$, $NiS_2$, $MoS_2$, $Co_2S_9$, $Co_2S_7$, $Ni_2S_7$, $Fe_2S_7$, $Mo_2S_3$, and/or $NiCoS_7$. Transition metal polysulfides are described further, for example, in Bowden et al., U.S. Pat. No. 4,481,267 and Bowden et al., U.S. Pat. No. 4,891,283. In some embodiments, the cathode active material includes a mixture of different transition metal polysulfides. In some embodiments, the transition metal polysulfides are mixed with other cathode active materials such as CuS, $Cu_2S$, FeS, CuO, $CF_x$, $MnO_2$, $V_2O_5$, $MoO_3$, $TiS_2$, $NbSe_2$, $NbSe_3$, and/or $Bi_2O_3$.

In some embodiments, when the transition metal polysulfide is $FeS_2$, the $FeS_2$ is a powder having a particle size sufficiently small that of particles will pass through a sieve of Tyler mesh size 325 (sieve openings of 0.045 mm). (The residue amount of $FeS_2$ particles not passing through the 325 mesh sieve is 10% max.) The Pyrox Red 325 $FeS_2$ can have an average particle size of between about 20 and 26 microns and a typical BET surface area of about 1.1 m$^2$/g and density of 4.7 gm/cm$^3$.

In some embodiments, the cathode active material further includes small amounts of impurities. For example, the cathode active material can have about zero weight percent (e.g., at least one weight percent, at least two weight percent, or at least three weight percent) and/or at most four weight percent (e.g., at most three weight percent, at most two weight percent, at most one weight percent) of impurities.

The cathode active material can have a mass (m) of at least four grams (g) (e.g., at least 4.5 grams, at least five grams, or at least 5.5 grams) and/or at most six grams (e.g., at most 5.5 grams, at most five grams, or at most 4.5 grams) in an electrochemical cell.

The conductive materials can enhance the electronic conductivity of cathode 16 within electrochemical cell 10. Examples of conductive materials include carbon black, graphitized carbon black, acetylene black, and graphite. In some embodiments, when the conductive material is graphite, the graphite can be available under the trade designation TIMREX KS6 graphite from Timcal America. TIMREX graphite is a relatively high crystalline synthetic graphite, BET surface area 20 m$^2$/g, density 2.25 g/cm$^3$. (Other graphites can be employed selected from natural, synthetic, or expanded graphite and mixtures thereof) The carbon black can be an acetylene black available under the trade designation Super P conductive carbon black (BET surface area of 62 m$^2$/g, bulk density in bag 0.160 g/cm$^3$,) from Timcal Co. Super P acetylene black has a pH of about 10 as measured by ASTM D1512-95. The cathode material includes, for example, at least about 3% by weight and up to about 8% by weight of one or more conductive materials.

The binders can help maintain homogeneity of the cathode material and can enhance the stability of the cathode. In some embodiments, the binders are film-formers, and can have good affinity and cohesive properties for the cathode active materials and conductive materials. The binders can be chemically stable when exposed to an electrolyte. Examples of binders include linear di- and tri-block copolymers. Additional examples of binders include linear tri-block polymers cross-linked with melamine resin; ethylene-propylene copolymers; ethylene-propylene-diene terpolymers; tri-block fluorinated thermoplastics; fluorinated polymers; hydrogenated nitrile rubber; fluoro-ethylene-vinyl ether copolymers; thermoplastic polyurethanes; thermoplastic olefins; styrene-ethylene-butylene-styrene block copolymers (e.g., Kraton G1651 elastomer from Kraton Polymers, Houston, Tex.); and polyvinylidene fluoride based polymers (Kynars). The cathode material includes, for example, at least about 1% by weight and/or up to about 6% by weight of one or more binders.

The cathode current collector can be formed, for example, of one or more metals and/or metal alloys. Examples of metals include titanium, nickel, and aluminum. Examples of metal alloys include aluminum alloys (e.g., 1N30, 1230, 1145, 1235) and stainless steel. The current collector generally can be in the form of a foil (for example, a continuous solid sheet without apertures) or a grid. The foil can have, for example, a thickness of up to about 35 microns and/or at least about 10 microns.

While electrochemical cell 10 in FIG. 1 is a primary cell, in some embodiments a secondary cell can have a cathode that includes the above-described cathode active material.

Cathode 16 can be formed by first combining one or more cathode active materials, conductive materials, and binders with one or more solvents to form a slurry (e.g., by dispersing the cathode active materials, conductive materials, and/or binders in the solvents using a double planetary mixer), and then coating the slurry onto the current collector, for example, by extension die coating or roll coating. The slurry coating on the current collector can then be dried in a conventional convective air oven to evaporate the solvents. Then a coating of the wet slurry can optionally also be applied to the opposite side of the current collector. In such case the wet coating on the opposite side of the current collector is similarly dried in a convective air oven to evaporate solvents. The coated current collector can then be calendered resulting in a compacted smooth dry cathode coating having a desired thickness and porosity on a current collector.

In some embodiments, to form the slurry, solvents are first mixed with binder to form a binder/solvent mixture. Cathode active materials and carbon particles can be separately premixed and then added to the binder/solvent mixture. The solvents can include a mixture of $C_9$-$C_{11}$ (predominately $C_9$) aromatic hydrocarbons available as ShellSol A100 hydrocarbon solvent (Shell Chemical Co.) and a mixture of primarily isoparaffins (average M.W. 166, aromatic content less than 0.25 wt. %) available as Shell Sol OMS hydrocarbon solvent (Shell Chemical Co.). The weight ratio of ShellSol A100 to ShellSol OMS solvent is desirably at a 4:6 weight ratio. The ShellSol A100 solvent is a hydrocarbon mixture containing mostly aromatic hydrocarbons (over 90 wt % aromatic hydrocarbon), primarily $C_9$ to $C_{11}$ aromatic hydrocarbons. The ShellSol OMS solvent is a mixture of isoparaffin hydrocarbons (98 wt. % isoparaffins, M.W. about 166) with less than 0.25 wt % aromatic hydrocarbon content. The slurry formulation can be dispersed using a double planetary mixer. Dry powders (e.g., $FeS_2$ powder and carbon particles) are first blended to ensure uniformity before being added to the Kraton G1651 binder solution in the mixing bowl. The solvents are then added and the components blended in the mixer and until a homogeneous slurry mixture is obtained.

In some embodiments, the cathode slurry includes 2 to 4 wt % of binder (Kraton G1651 elastomeric binder from Kraton Polymers, Houston Tex.); 50 to 70 wt % of active $FeS_2$ powder; 4 to 7 wt % of conductive carbon (acetylene carbon black and/or graphite); and 25 to 40 wt % of solvent(s).

In certain embodiments, calendering can result in the reduction of pores in the cathode material of a cathode. These pores can, for example, permit an electrolyte to diffuse within a battery including the cathode. The diffusion of the electrolyte can, in turn, result in enhanced electrochemical performance of the battery. In some embodiments, the cathode material of a cathode can have a porosity of at least about 18 percent (e.g., at least about 20 percent, at least about 25 percent, or at least about 30 percent) and/or at most about 35 percent (e.g., at most about 30 percent, at most about 25 percent, or at most about 20 percent). In certain embodiments, the cathode material of a cathode can have a porosity of from about 20 percent to about 30 percent. As used herein, the porosity of the cathode material of a cathode is equal to the percent by volume of the cathode material that is occupied by pores. The porosity of the cathode material is calculated according to equation (2) below, in which $V_{final}$=volume of the final cathode, and $V_{theo}$=theoretical volume of the cathode material in the final cathode minus the volume of the current collector:

$$\% \text{ Porosity} = \frac{V_{final} - V_{theo}}{V_{final}} * 100 \qquad (2)$$

Anode 12 includes one or more alkali metals (e.g., lithium, sodium, potassium) as the anode active material. The alkali metal may be the pure metal or an alloy of the metal. Lithium is the preferred metal; lithium can be alloyed, for example, with other alkali metals, an alkaline earth metal, or aluminum. The lithium alloy may contain, for example, at least about 50 ppm and up to about 5000 ppm (e.g., at least about 500 ppm and up to about 2000 ppm) of aluminum or other alloyed metal. The lithium or lithium alloy can be incorporated into the battery in the form of a foil. In some embodiments, the anode foil can have a thickness of about 0.15 mm.

Alternatively, anode 12 can include a particulate material such as lithium-insertion compounds, for example, $LiC_6$, $Li_4Ti_5O_{12}$, $LiTiS_2$ as the anode active material. In these embodiments, anode 12 can include one or more binders. Examples of binders include polyethylene, polypropylene, styrene-butadiene rubbers, and polyvinylidene fluoride (PVDF). The anode composition includes, for example, at least about 2% by weight and up to about 6% by weight of binder. To form the anode, the anode active material and one or more binders can be mixed to form a paste which can be applied to a substrate. After drying, the substrate optionally can be removed before the anode is incorporated into the housing.

The anode includes, for example, at least about 90% by weight and up to about 100% by weight of anode active material.

The electrolyte preferably is in liquid form, and can be placed into a battery housing including the cathode, the anode, and the separator while the housing is under vacuum. The electrolyte has a viscosity, for example, of at least about 0.2 cps (e.g., at least about 0.5 cps) and up to about 2.5 cps (e.g., up to about 2 cps or up to about 1.5 cps). As used herein, viscosity is measured as kinematic viscosity with a Ubbelohde calibrated viscometer tube (Cannon Instrument Company; Model C558) at 22° C.

The electrolyte can include a variety of solvents. In some embodiments, the electrolytic solution or electrolyte can be in liquid, solid or gel (polymer) form. In some embodiments, the electrolyte can include an organic solvent such as propylene carbonate (PC), ethylene carbonate (EC), dimethoxyethane (DME) (e.g., 1,2-dimethoxyethane), butylene carbonate (BC), dioxolane (DX), tetrahydrofuran (THF), gamma-butyrolactone, diethyl carbonate (DEC), dimethyl carbonate (DMC), ethyl methyl carbonate (EMC), dimethylsulfoxide (DMSO), methyl formate (MF), sulfolane, or a combination (e.g., a mixture) thereof. In certain embodiments, the electrolyte can include an inorganic solvent, such as $SO_2$ or $SOCl_2$. In some embodiments, the electrolyte can include a combination of two or more ethers. The ether content can be at least 95 vol % (e.g., at least 96 vol %, at least 97 vol %, at least 98%, or at least 99 vol %) of a total volume of solvents used for electrolyte formulation.

In some embodiments, the electrolyte includes one or more salts (e.g., two salts, three salts, four salts). Examples of salts include lithium salts, such as lithium trifluoromethanesulfonate (LiTFS), lithium trifluoromethane-sulfonimide (LiTFSI), lithium iodide (LiI), lithium bromide (LiBr), lithium tetrafluoroborate ($LiBF_4$), lithium perchlorate ($LiClO_4$), and lithium hexafluorophosphate ($LiPF_6$). Additional lithium salts that can be included are described, for example, in Suzuki, U.S. Pat. No. 5,595,841. Other salts that can be included in the electrolyte are bis(oxalato)borate salts (e.g., ($LiB(C_2O_4)_2$)) and lithium bis(perfluoroethyl)sulfonimide ($LiN(SO_2C_2F_5)_2$). Bis(oxalato)borate salts are described, for example, in Totir et al., U.S. Patent Application Publication No. US 2005/0202320 A1, published on Sep. 15, 2005, and entitled "Non-Aqueous Electrochemical Cells". The electrolyte includes, for example, at least about 0.1 M (e.g., at least about 0.5 M or at least about 0.7 M) and/or up to about 2 M (e.g., up to about 1.5 M or up to about 1.0 M) of the lithium salts.

In some embodiments, an electrolyte solution includes a mixture of $Li(CF_3SO_2)_2N$ (LiTFSI) salt dissolved in a solvent mixture of 1,3 dioxolane (70-80 vol %) and sulfolane (20-30 vol %), as in commonly assigned U.S. patent application Ser. No. 11/494,244. Pyridine in amount between about 0.05 and 1.0 wt. %, for example about 0.1 wt. %, is added to the electrolyte to reduce the chance of minor amounts of polymerization of 1,3-dioxolane.

In some embodiments, the battery active materials have a volume that can increase, decrease, or remain the same during battery discharge. A general formula for calculating the change in active material volume during battery discharge can be as follows:

$$wA + xB = yC + zD$$

where A, B are reactants (e.g., battery active materials); C, D are products; and w, x, y, and z are stoichiometric coefficients. The absolute volume change ($\Delta V$) of this reaction, which can be positive or negative, can be expressed as:

$$\Delta V = \{y*MW_C/\rho_C + z*MW_D/\rho_D\} - \{w*MW_A/\rho_A + x*MW_B/\rho_B\}$$

where $MW_i$ is a molecular weight of reactant or product "i" and $\rho_i$ is a density of reactant or product "i".

In some embodiments, a theoretical minimum electrolyte volume needed to obtain a satisfactory performance from battery discharge can be calculated. For example, the theoretical minimum electrolyte volume can be obtained by adding the total pore volume in the electrochemical cell (defined as the sum of the volume of the pores in a separator and the volume of the pores in the cathode) and the void volume created as the cell discharges. As discussed above, the void volume that is created during discharge is due to the difference in density between the products of the discharge reaction and the initial reagents.

As shown in Table 1, in a lithium-iron disulfide electrochemical cell having an overall reaction $FeS_2 + 4 Li^+ \rightarrow Fe + 2 Li_2S$, the volumes of the starting materials and the products can be obtained from the molecular weights and densities of the starting materials and the final products. The percentage of change in volume for the reaction can then be determined. For the reaction above, the percent change in volume between the starting materials and the products is −18.54%.

The absolute volume decrease for a battery having a $FeS_2$ loading of 4.97 grams at 1.05V cutoff (or 0.9 V cutoff) can be determined from the ampere-hour (Ah) for 1 Mol of reacted $FeS_2$, the absolute $\Delta V/Ah$, and the Ah for 1.05 V cut-off (or 0.9 V cut-off), according to Table 1 and the equations therein. Thus, for a battery having a 4.97 gram loading of $FeS_2$, the $\Delta V$ for 1.05 V cut-off is −0.38 cubic centimeters (cc, or milliliters (ml)) upon battery discharge, and the $\Delta V$ for 0.9 V cut-off is −0.43 cc upon battery discharge.

TABLE 1

Calculations for $\Delta V$.

| | Starting materials | | Products | |
|---|---|---|---|---|
| | $FeS_2$ | $4 Li^+$ | Fe | $2 Li_2S$ |
| Molecular weight (g) | 119.975 | 27.756 | 55.847 | 91.884 |
| Density (g/cc) | 4.7 | 0.534 | 7.86 | 1.64 |
| Volume (cc) | 25.53 | 51.98 | 7.11 | 56.03 |
| Absolute $\Delta V$ (cc) = ($V_{products} - V_{starting\_materials}$) | | −14.372 | | |
| $\Delta V$ (relative to starting materials) = $\dfrac{V_{products} - V_{starting\_materials}}{V_{starting\_materials}}$ | | −0.1854 (or −18.54%) | | |
| Ah for 1 Mol of reacted $FeS_2$ (Ah) | | 107.08 | | |
| Absolute $\Delta V/Ah$ (cc/Ah) = Absolute $\Delta V/Ah$ for 1 Mol of reacted $FeS_2$ | | −0.1342 | | |
| Ah for 1.05 V cut-off for a battery having a 4.97 gram loading of $FeS_2$ (Ah) | | 2.8 | | |
| Ah for 0.9 V cut-off for a battery having a 4.97 gram loading of $FeS_2$ (Ah) | | 3.2 | | |
| $\Delta V$ for 1.05 V cut-off (cc) = (Absolute $\Delta V/Ah$) × (Ah for 1.05 V cut-off) | | −0.38 | | |
| $\Delta V$ for 0.9 V cut-off (cc) = (Absolute $\Delta V/Ah$) × (Ah for 0.9 V cut-off) | | −0.43 | | |

To compensate for the decrease in volume in the cathode active material (i.e., the increased void volume), the amount of electrolyte can be increased by at least the same volume as the increase in void volume. As an example, for a battery having a 4.97 g loading of $FeS_2$ and a discharge cut-off of 1.05V where the void volume increase is 0.38 ml, the electrolyte fill volume should be increased by 0.38 ml.

Thus, in the above lithium-iron disulfide electrochemical cell, if the volume of the pores in both separators is 0.3242 ml, the volume of pores in the cathode at 0% depth of discharge is 0.4107 ml, and the void volume created during discharge is 0.38 ml as calculated above, the theoretical minimum volume required to obtain satisfactory performance would be 1.11 ml. Surprisingly, it was observed that the actual minimum electrolyte volume required to obtain satisfactory performance in the cell is much greater than the theoretical minimum volume. For example, the actual minimum electrolyte volume can be about 1.63 ml or greater to obtain satisfactory performance.

In some embodiments, the amount of electrolyte can be expressed by the ratio of electrolyte volume (v) in the cell to cathode active material (e.g., $FeS_2$) mass (m). For example, in the above lithium-iron disulfide electrochemical cell, the actual minimum v/m ratio is calculated as 1.63 ml/4.97 g $FeS_2$=0.33 ml/g. In some embodiments, v/m ratios of greater than 0.33 ml/g can further improve electrochemical cell performance. For example, the electrolyte to cathode active material loading ratio can be at least 0.33 ml/g (e.g., at least 0.35 ml/g, at least 0.4 ml/g, at least 0.45 ml/g) and/or at most 0.5 ml/g (e.g., at most 0.45 ml/g, at most 0.4 ml/g, at most 0.35 ml/g).

The actual volume (v) of the electrolyte can be at most 2.2 ml (e.g., at most two ml, at most 1.9 ml, at most 1.8 ml, at most 1.7 ml, at most 1.6 ml, or at most 1.5 ml) and/or at least 1.4 ml (e.g., at least 1.5 ml, at least 1.6 ml, at least 1.7 ml, at least 1.8 ml, at least 1.9, or at most two ml). In some embodiments, the actual volume of the electrolyte in an electrochemical cell is greater than the theoretical minimum electrolyte volume. For example, the actual electrolyte volume can be at least 0.2 ml (e.g., at least 0.3 ml, at least 0.5 ml, at least 0.7 ml, at least one ml) and/or at most 1.5 ml (e.g., at most one ml, at most 0.7 ml, at most 0.5 ml, at most 0.3 ml) greater than the theoretical minimum electrolyte volume.

Positive lead 18 can include stainless steel, aluminum, an aluminum alloy, nickel, titanium, or steel. Positive lead 18 can be annular in shape, and can be arranged coaxially with the cylinder of a cylindrical cell. Positive lead 18 can also include radial extensions in the direction of cathode 16 that can engage the current collector. An extension can be round (e.g., circular or oval), rectangular, triangular or another shape. Positive lead 18 can include extensions having different shapes. Positive lead 18 and the current collector are in electrical contact. Electrical contact between positive lead 18 and the current collector can be achieved by mechanical contact. In some embodiments, positive lead 18 and the current collector can be welded together.

Separator 20 can be formed of any of the standard separator materials used in electrochemical cells. For example, separator 20 can be formed of polypropylene (e.g., nonwoven polypropylene, microporous polypropylene), polyethylene, a polysulfone, or combinations of the above materials. The separator can have a thickness of between 12 microns and 25 microns (e.g., between 15 and 23 microns, or between 15 and 20 microns) and/or a porosity of between 37 and 70 percent (e.g., between 40 and 70 percent, between 40 and 60 percent, between 50 and 70 percent). The separator can have an area specific resistance of as low as one Ohm*$cm^2$ (e.g., as low as two Ohm*$cm^2$, as low as three Ohm*$cm^2$, or about 1.3 Ohm*$cm^2$), and separator can have a tortuosity of as low as 1.3 (e.g., as low as 1.5, as low as 1.7, or as low as 1.9). Separators are described, for example, in Blasi et al., U.S. Pat. No. 5,176,968. The separator may also be, for example, a porous insulating polymer composite layer (e.g., polystyrene rubber and finely divided silica).

Case 22 can be made of, for example, one or more metals (e.g., aluminum, aluminum alloys, nickel, nickel plated steel, stainless steel) and/or plastics (e.g., polyvinyl chloride, polypropylene, polysulfone, ABS, polyamide).

Cap 24 can be made of, for example, aluminum, nickel, titanium, or steel, and can include one or more vents. The vents can be made of aluminum or aluminum alloys, such as A15052.

To assemble the cell, separator 20 can be cut into pieces of a similar size as anode 12 and cathode 16 and placed therebetween. In some embodiments, the anode, cathode, and separator are spirally wound. Anode 12, cathode 16, and separator 20 are placed within case 22, and one end of case 22 is closed with cap 24 having one or more vents and annular insulating gasket 26, which can provide a gas-tight and fluid-tight seal. Positive lead 18 connects cathode 16 to cap 24. Safety valve 28 is disposed in the inner side of cap 24 and is configured to decrease the pressure within electrochemical cell 10 when the pressure exceeds some predetermined value. The case can first be placed under vacuum (e.g., to 10 mm Hg, 15 mm Hg, 27 mm Hg, or greater), and the electrolyte can then be added into the case while the case is under vacuum. An electrolyte filling station (available from HIBAR Systems Limited) can be used to fill cells with electrolyte while the cell is under vacuum. Methods for assembling an electrochemical cell are described, for example, in Moses, U.S. Pat. No. 4,279,972, Moses et al., U.S. Pat. No. 4,401,735, and Kearney et al., U.S. Pat. No. 4,526,846.

Without wishing to be bound by theory, it is believed that greater vacuum within the housing is correlated with the amount of electrolyte that can be added into the housing, as a greater vacuum can remove more air or other gas from any pores within the electrodes and separator in the housing. For example, a housing under greater vacuum can include more electrolyte, since a greater amount of air or other gas is removed from the housing and its contents (e.g., the pores within the cathode and/or the separator). Greater vacuum within the housing can decrease the amount of time necessary for electrolyte addition.

Other configurations of an electrochemical cell can also be used, including, for example, the button or coin cell configuration, the prismatic cell configuration, the rigid laminar cell configuration, and the flexible pouch, envelope or bag cell configuration. Furthermore, an electrochemical cell can have any of a number of different voltages (e.g., 1.5 V, 3.0 V, 4.0 V). Electrochemical cells having other configurations are described, for example, in Berkowitz et al., U.S. Ser. No. 10/675,512, U.S. Pat. App. Pub. 2005/0112467 A1, and Totir et al., U.S. Pat. App. Pub. 2005/0202320 A1.

The following examples are meant to be illustrative and not to be limiting.

Example 1

AA size Li/$FeS_2$ test cells (49×12 mm) were produced. The cathode coating had a slurry composition as shown in Table 1. The slurry was coated via roll coating technique on both sides of a sheet of aluminum foil substrate of thickness 1 mil (0.025 mm) without any opening therethrough. The coated aluminum foil was dried by gradually adjusting or ramping up an oven temperature (to avoid cracking the coating) from an initial temperature of 40° C. to a final temperature not to exceed 130° C. for about 7-8 minutes or until the solvent has substantially all evaporated (At least about 95 percent by weight of the solvents are evaporated or at least about 99.9 percent by weight of the solvents are evaporated.). The dried coated aluminum foil is then calendered. The separator was microporous polypropylene (Celgard 2400) of 1 mil (0.025 mm) thickness. The anode was a sheet of lithium metal.

TABLE I

Cathode Composition

| | Wet Cathode Slurry (wt. %) | Dry Cathode (wt. %) |
|---|---|---|
| Binder (Kraton G1651) | 2.0 | 3.01 |
| Hydrocarbon Solvent (ShellSol A100) | 13.4 | 0.0 |
| (ShellSol OMS) | 20.2 | 0.0 |
| FeS$_2$ Powder (Pyrox Red 325) | 58.9 | 88.71 |
| Graphite (Timrex KS6) | 4.0 | 6.02 |
| Acetylene Carbon Black (Super P) | 1.5 | 2.26 |
| Total | 100.0 | 100.00 |

The anode, cathode, separators, and an insulating polypropylene tape were spirally wound to the shape of the casing body. The spirally wound electrode assembly was inserted into the open end of the casing. The casing was placed under vacuum, then the electrolyte was added to the cell while the case is under vacuum. The electrolyte added to the cell included a mixture of Li(CF$_3$SO$_2$)$_2$N (LiTFSI) salt (0.8 mols/liter) dissolved in a solvent mixture of 1,3 dioxolane (80 vol %) and sulfolane (20 vol %). Also, 0.1 wt. % pyridine was added to form the final electrolyte solution. The casing was then capped with a cap.

A metal tab 44 (anode tab) was pressed into a portion of the lithium metal anode. The anode tab was pressed into the lithium metal at any point within the spiral. The anode tab was embossed on one side forming a plurality of raised portions on the side of the tab to be pressed into the lithium. The opposite side of tab was welded to the inside surface of the closed end of the casing. The primary lithium cell had a PTC (positive thermal coefficient) device located under the end cap and connected in series between the cathode and end cap.

In the test cells, the cathode contained on average 4.97 g iron disulfide (FeS$_2$, Pyrox Red 325) as cathode active material. The cells had an interfacial surface area between anode and cathode with separator therebetween of about 300 cm$^2$. The cells were balanced so that the theoretical capacity of the anode was lower than the theoretical capacity of the cathode.

Specifically, the test cells were balanced so that the ratio of the theoretical capacity of the anode to the theoretical capacity of the cathode was about 0.9. (The theoretical capacity of the anode is the theoretical specific capacity of lithium metal, 3861.4 mAmp-hr/gram, multiplied by the weight in grams of the lithium and the theoretical capacity of the cathode is the theoretical specific capacity of FeS$_2$, 893.5 mAmp-hr/gram, multiplied by the weight in grams of the FeS$_2$.)

Figure 2:
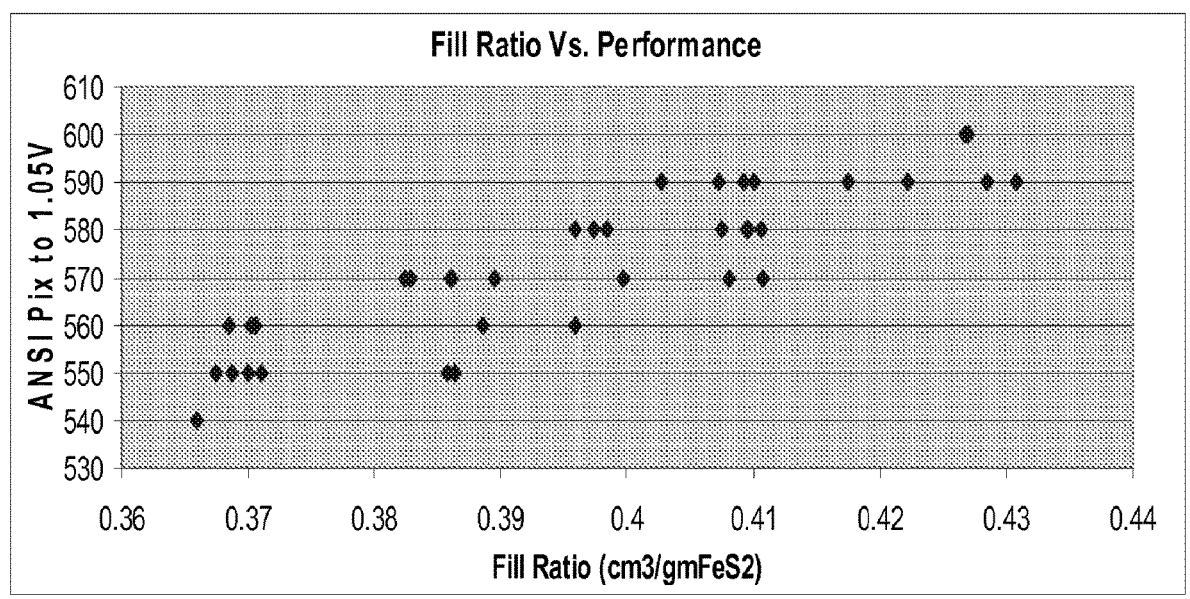
FIG. 2 is a graph showing an electrochemical cell performance as a function of electrolyte fill ratio of an embodiment of a non-aqueous electrochemical cell.

The volume of pores in both separators was 0.3242 ml, the volume of pores in the cathode was 0.4107 ml. The theoretical minimum electrolyte volume was calculated to be 1.11 ml. The cell performance was measured using an ANSI digital picture test at 1.05V cutoff. The cell performance was plotted against the electrolyte fill ratio (defined as volume of electrolyte (v)/mass of cathode active material (m)). Referring to FIG. 2, a ratio of greater than 0.33 ml/g led to performance improvements, which increased as the electrolyte fill ratio was increased up to 0.43 ml electrolyte/g FeS$_2$ (or 2.14 ml electrolyte total in the electrochemical cell).

For the ANSI digital picture test, after the fresh cells were predischarged (by subjecting the cells to a the predischarge protocol including a series of cycles, each cycle consisting of about 2 Amp pulse "on" for 7 seconds followed by 20 seconds "off" to remove about 3% of cell capacity), and stored for 14 days at ambient room temperature (about 20° C.), the cells were subjected to the digital picture test designed to simulate use in digital cameras.

ANSI Digital Picture Test

The digital camera test consists of the following pulse test protocol wherein each test cell was drained by applying pulsed discharge cycles to the cell: Each cycle consists of both a 1.5 Watt pulse for 2 seconds followed immediately by a 0.65 Watt pulse for 28 seconds. This is repeated 10 times followed by 55 minutes rest. Then the cycling is repeated until the cutoff voltage is reached. The cycles are continued until a cutoff voltage of 1.05V is reached. The number of cycles required to reach these cutoff voltages was recorded. (The number of pulses reported consists of the high 1.5 Watt pulses, which corresponds to the number of pulsed cycles.)

Other Embodiments

While certain embodiments have been described, other embodiments are possible. For example, electrochemical cells such as AAA, AAAA, C, D, and/or other sizes of batteries can be made where the volume of the electrolyte is increased to compensate for the increase in void volume during battery discharge.

All references, such as patent applications, publications, and patents, referred to herein are incorporated by reference in their entirety.

Other embodiments are in the claims.

What is claimed is:

1. A battery, comprising a housing, and within the housing:
    (a) an anode comprising an alkali metal;
    (b) a cathode comprising a mass (m) of a cathode active material;
    (c) a separator therebetween the anode and the cathode;
    (d) a volume (v) of an electrolyte,
    wherein the cathode active material is iron disulfide and the ratio v/m is at least 0.33 ml/g to at most 0.55 ml/g.

2. The battery of claim 1, wherein the mass (m) is at least four grams and at most six grams.

3. The battery of claim 1, wherein the cathode has a porosity of at most 35%.

4. The battery of claim 1, wherein the volume (v) of electrolyte is at least 1.4 ml and at most 2.2 ml.

5. The battery of claim 1, wherein the alkali metal is lithium.

6. The battery of claim 5, wherein the lithium is alloyed with aluminum.

7. The battery of claim 5, wherein the lithium metal is not alloyed with another metal.

8. The battery of claim 1, wherein the cathode comprises a further cathode active material selected from CuS, Cu$_2$S, FeS, CuO, MnO$_2$, V$_2$O$_5$, MoO$_3$, TiS$_2$, NbSe$_2$, NbSe$_3$, Bi$_2$O$_3$ and combinations thereof.

9. The battery of claim 1, wherein the electrolyte further comprises a lithium salt.

10. The battery of claim 1, wherein the battery is a primary battery.

11. The battery of claim 1, wherein the battery is a AA battery.

12. The battery of claim 1, wherein the separator has a thickness of between 12 microns and 25 microns.

13. The battery of claim 1, wherein the separator has a porosity between 37% and 70%.

14. The battery of claim 1, wherein the cathode further comprises a conductive material comprising carbon black, graphitized carbon black, acetylene black, or graphite.

15. The battery of claim 1, wherein the cathode further comprises a binder.

16. A method of using a battery, comprising:
discharging but not recharging a battery comprising a housing, and within the housing:
(a) an anode comprising an alkali metal;
(b) a cathode comprising a mass (m) of a cathode active material;
(c) a separator therebetween the anode and the cathode;
(c) a volume (v) of an electrolyte,
wherein the cathode active material is iron disulfide and the ratio v/m is at least 0.33 ml/g to at most 0.55 ml/g.

* * * * *